US006230655B1

United States Patent
Cohen et al.

(12) United States Patent
(10) Patent No.: US 6,230,655 B1
(45) Date of Patent: May 15, 2001

(54) LOCKING ASSEMBLY FOR SECURING A DOOR FOR A CAGE, ESPECIALLY A BIRD CAGE AND, ALTERNATIVELY, FOR PORTING SAID DOOR IN AN OPEN POSITION

(75) Inventors: Alan J. Cohen, Commack; Vincent J. Senese, Manorville, both of NY (US); Zjuli Cai, Foshan (CN)

(73) Assignee: Blue Ribbon Pet Products, Inc., Commack, NY (US)

( * ) Notice: Subject to any disclaimer, the term of this patent is extended or adjusted under 35 U.S.C. 154(b) by 0 days.

(21) Appl. No.: 09/199,140

(22) Filed: Nov. 24, 1998

(51) Int. Cl.$^7$ ..................................................... A01K 31/10
(52) U.S. Cl. ............................ 119/459; 119/452; 119/481
(58) Field of Search ................................... 119/459, 481, 119/452, 453; 292/19, 87

(56) References Cited

U.S. PATENT DOCUMENTS

| | | | |
|---|---|---|---|
| 702,798 | * | 6/1902 | Johnson . |
| 942,336 | * | 12/1909 | Moellenbrock . |
| 986,249 | * | 3/1911 | Walton . |
| 1,657,578 | * | 1/1928 | Markow . |
| 1,825,504 | * | 9/1931 | Carr . |
| 2,297,865 | * | 10/1942 | Behlen . |
| 2,806,446 | * | 9/1957 | Hendryx . |
| 3,244,146 | * | 4/1966 | Kurtz et al. . |
| 3,802,391 | * | 4/1974 | Peeler ................................... 119/479 |
| 4,419,962 | * | 12/1983 | Siciliano ............................... 119/481 |
| 5,373,810 | * | 12/1994 | Martin ................................... 119/459 |
| 6,032,614 | * | 3/2000 | Tominaga ............................. 119/452 |

* cited by examiner

Primary Examiner—Charles T. Jordan
Assistant Examiner—Yvonne R. Abbott
(74) Attorney, Agent, or Firm—Galgano & Burke

(57) ABSTRACT

A locking assembly for securing a cage door, such as a bird cage door, wherein the locking assembly includes a substantially M-shaped wire support, which may be made of a resilient material, such as a plastic or a metal, having two bottom ends which are each attached to a pivot support of the cage door. The opposite end of the M-shaped wire locking device has two foot-shaped locking feet, which may be engaged under two locking slots, or loops, provided in the bird cage adjacent to the cage door. The locking device further includes a pair of finger grips which, when squeezed together by a user, cause inward displacement of the locking feet, such that they are removed, or displaced from, the locking slots or loops of the cage. In this "squeezed" position, the door of the bird cage can be pivoted to an "open" position for allowing entry into the cage. When it is desirable to re-lock the cage, the cage door is readily pivoted back toward the "closed" position, after which the finger grips are then released by the user for allowing the locking feet to re-enter the locking slots or loops, for locking the cage door in place. In an alternative embodiment, the M-shaped wire support is replaced by a scissors-like wire support, which operates similarly, but causes an outward displacement of the locking feet when squeezed at its base portion.

14 Claims, 5 Drawing Sheets

LOCKING ASSEMBLY FOR SECURING A DOOR FOR A CAGE, ESPECIALLY A BIRD CAGE AND, ALTERNATIVELY, FOR PORTING SAID DOOR IN AN OPEN POSITION

BACKGROUND OF THE INVENTION

1. Technical Field of the Invention

The present invention relates, generally, to a locking assembly for securing a door for a cage, particularly the door for a bird cage.

More particularly, the present invention provides a relatively simple, yet highly effective locking assembly for a bird cage comprising a substantially M-shaped, or scissored-shaped, wire support, with finger grips, for locking the cage door. The M-shaped wire support is also capable of supporting the bird cage door when the door is in an open position.

2. Description of the Prior Art

The prior art, generally, includes various latching, closure and hooking articles and assemblies, as broadly represented by Thielepape et al., U.S. Pat. No. 158,334, issued Dec. 29, 1874; Morrison, U.S. Pat. No. 637,643, issued Nov. 21, 1899; Alexander, U.S. Pat. No. 654,044, issued Jul. 17, 1900; Cilley et al., U.S. Pat. No. 1,102,720, issued Jul. 7, 1914; Williamson, U.S. Pat. No. 1,313,969, issued Aug. 26, 1919; Hines, U.S. Pat. No. 2,219,228, issued Oct. 22, 1940; Jason, U.S. Pat. No. 2,312,821, issued Mar. 2, 1943; Ducharme et al., U.S. Pat. No. 2,920,915; Getzin, U.S. Pat. No. 3,100,557, issued Aug. 13, 1963; Jacobs, U.S. Pat. No. 3,226,961, issued Jan. 4, 1966; and, Jones, U.S. Pat. No. 3,620,559, issued Nov. 16, 1971.

The latching and closure assemblies of the cited prior art are for a very wide variety of articles and apparatuses, ranging from cooking vessels, to screen doors and washing machines. Of the art known to the inventor, only U.S. Pat. Nos. 2,920,925 and 3,620,559 would even appear to pertain to cages or the like. Each of U.S. Pat. Nos. 2,920,925 and 3,620,559 teach the use of latching assemblies which would appear to rely upon a cross-bar to retain the cage door therein in a closed and locked state. Neither of said prior art patents would appear to teach or suggest a cage locking assembly having an M-shape and which is reliant upon a resilient fit between the two lower portions of the M-shaped, or scissored-shaped, article and the vertical bars comprising the cage.

Additionally, none of the prior art known to the inventor provides a latching or locking assembly which is, in the alternative, capable of supporting a conventional bird cage door in an open position.

To date, the prior art has failed to provide a simple and convenient locking assembly for the door of a bird cage, which avoids the unsightly drawbacks inherent with the use of a standard cross-bar and which is capable of being secured and locked by the user utilizing only a single hand.

SUMMARY OF THE INVENTION

It is, therefore, an object of the present invention to provide a relatively simple, yet highly effective locking assembly for a cage door, particularly, a bird cage door, which avoids the unsightly drawbacks that a latching mechanism which relies upon the use of a cross-bar necessarily includes.

It is, yet, a further object of the present invention to provide a simple and highly effective locking assembly for a cage door, particularly, a bird cage door, which would allow the user to readily secure and lock the cage door using only a single hand.

It is, still, an additional object of the present invention to provide a simple and highly effective locking assembly for a cage door, particularly, a bird cage door, which may alternatively be used for supporting the cage door in an open position.

It is an overall object of the present invention to provide a simple and highly effective locking assembly for a cage door, particularly, a bird cage door, which avoids the drawbacks inherent in prior art devices intended for a similar purpose.

The foregoing and related objects are achieved by the present invention for a locking assembly for securing a cage door, such as a bird cage door, wherein the locking assembly, in a preferred embodiment, includes a substantially M-shaped wire support, which may be made of a resilient material, such as a plastic (e.g., polypropylene) or a metal (e.g., stainless steel), having two bottom ends which are each attached to a pivot support of the cage door. The opposite end of the M-shaped wire locking device has two foot-shaped locking feet, which are engagable under two locking slots, or loops, provided in the bird cage adjacent to the cage door.

The locking device of the present invention is further provided with a pair of finger grips which, when squeezed together by a user, cause inward displacement of the locking feet, such that they are removed or displaced from the locking slots or loops of the cage. In this "squeezed" position, the door of the bird cage can be pivoted to an "open" position for allowing entry into the cage.

When it is desirable to re-lock the cage, the cage door is readily pivoted back toward the "closed" position, after which the finger grips are then released by the user for allowing the locking feet of the present invention to re-enter the locking slots or loops, thereby locking the cage door in place.

As can be appreciated, while it is conceivable that a bird may be sufficiently smart and strong to unlock one of the locking feet, it is not seen as being possible for a bird to simultaneously remove the cage door for both locking feet, as a result of which the locking position of the cage door is maintained by the locking device.

In an alternatively, preferred embodiment of the present invention, a slightly differently configured locking device, which operates in a comparable fashion, is also disclosed by the inventor and is within the scope of the present invention. In this alternatively, preferred embodiment, the M-shaped article of the invention is slightly altered so that it has a scissor-like arrangement, which may be made of a resilient material, such as a plastic (e.g., polypropylene) or a metal (e.g., stain-less steel.) Here, a scissor-like arrangement is used, in which when one squeezes the base portion thereof, the locking feet are displaced outwardly from the locking slots or loops of the cage to thereby unlock the cage door.

Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the invention.

BRIEF DESCRIPTION OF THE DRAWING FIGURES

In the drawing, wherein similar reference numerals denote similar features throughout the several views.

Figure 8:
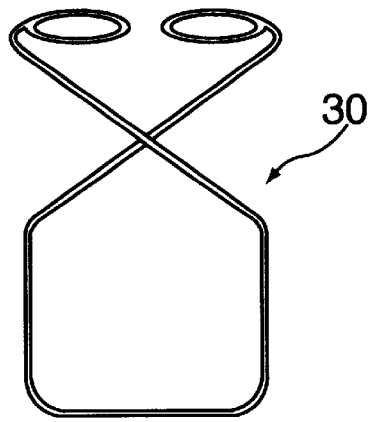
FIG. 8 is a schematic illustration of an alternate, preferred embodiment of the present invention in which a scissors-like element is used in place of the M-shaped wire support of the locking assembly of FIGS. 1–7.
Figure 9:
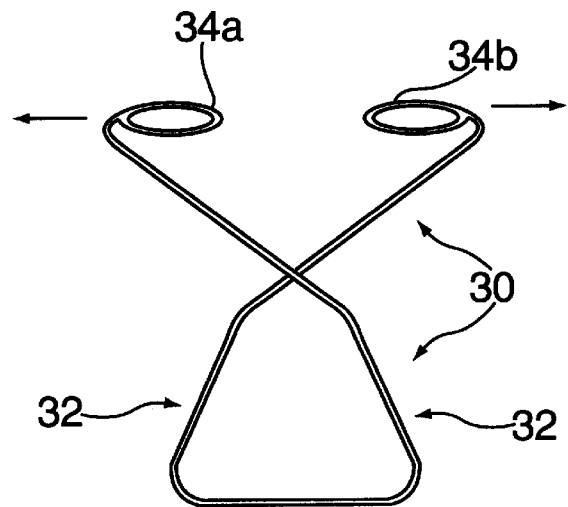
FIG. 9 is a schematic illustration of the scissors-like element of FIG. 8 when the lower portion thereof is gripped, or squeezed, by a user, thereby causing the upper, scissors like portion, or locking feet, to separate outwardly.
Figure 10:
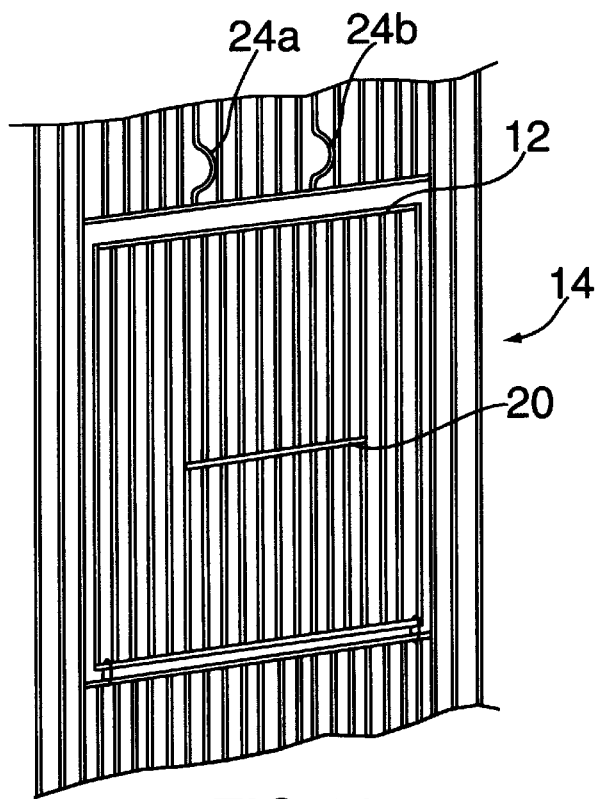
Figure 11:
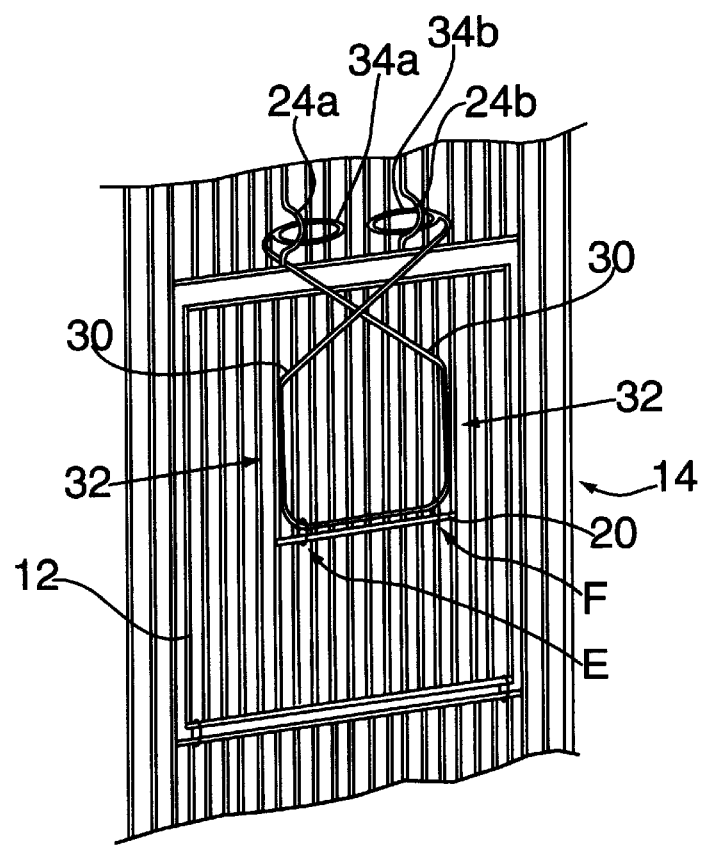

FIG. 10 is a perspective view of a bird cage, having the door thereof in a "closed" position, showing the locking slots, or loops, of the cage, prior to attachment of the scissors like element of FIGS. 8 and 9; and FIG. 11 is a perspective view of the bird cage of FIG. 10, after the scissors-like element of FIGS. 8 and 9 has been pivotally-attached to a portion of the cage door, while the locking feet of the scissors-like element are shown in engagement with the locking slots, or loops, of the cage.

DETAILED DESCRIPTION OF THE DRAWING FIGURES AND PREFERRED EMBODIMENTS

Turning now, in detail, to an analysis of the drawing figures, FIGS. 1–4 illustrate the locking assembly 10 of the present invention retaining cage door 12 of bird cage 14 in a "closed" position. Locking assembly 10 includes a substantially M-shaped wire support 16, with two bottom segments 18a, 18b being attached at pivot points A, B, to a cross-bar support 20 of cage door 12.

Figure 5:
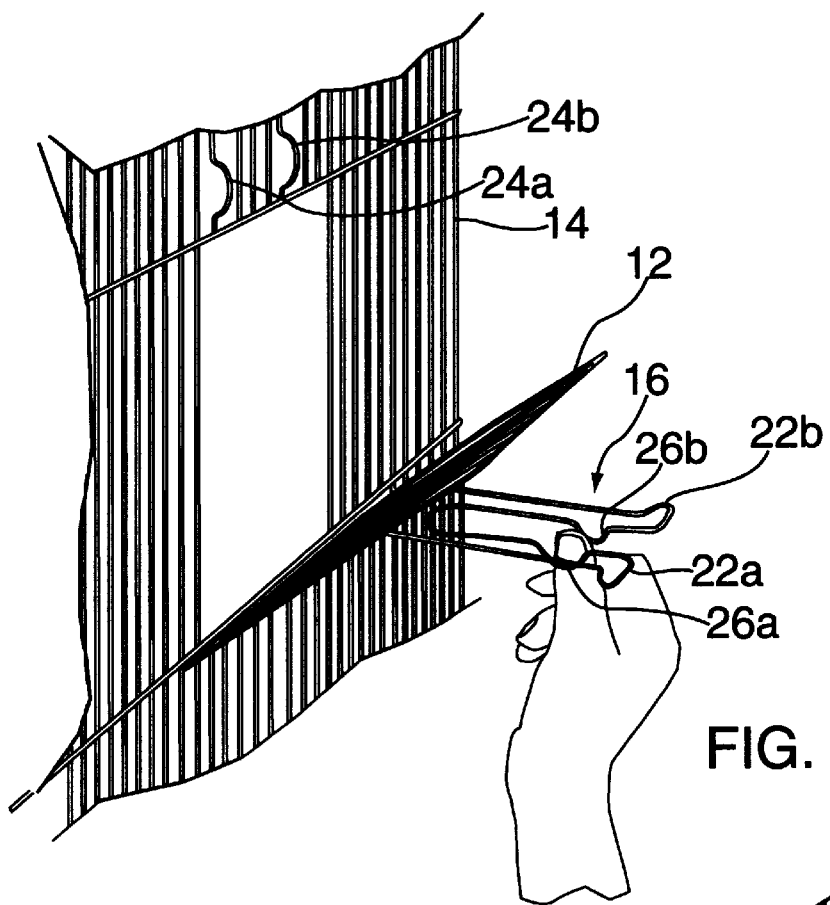
FIG. 5 is a perspective view of the cage door lock assembly of the present invention of FIG. 4, during the process of opening the cage door and pivoting the M-shaped portion thereof so that the foot-shaped locking feet are able to set the cage door in a horizontal arrangement.

The opposite end of substantially M-shaped wire support has two foot-shaped locking feet 22a, 22b, which are each, respectively, engageable with to locking slots 24a, 24b, or two loops, provided in bird cage 14, and which are best shown in the perspective view of FIG. 5.

Figure 4:
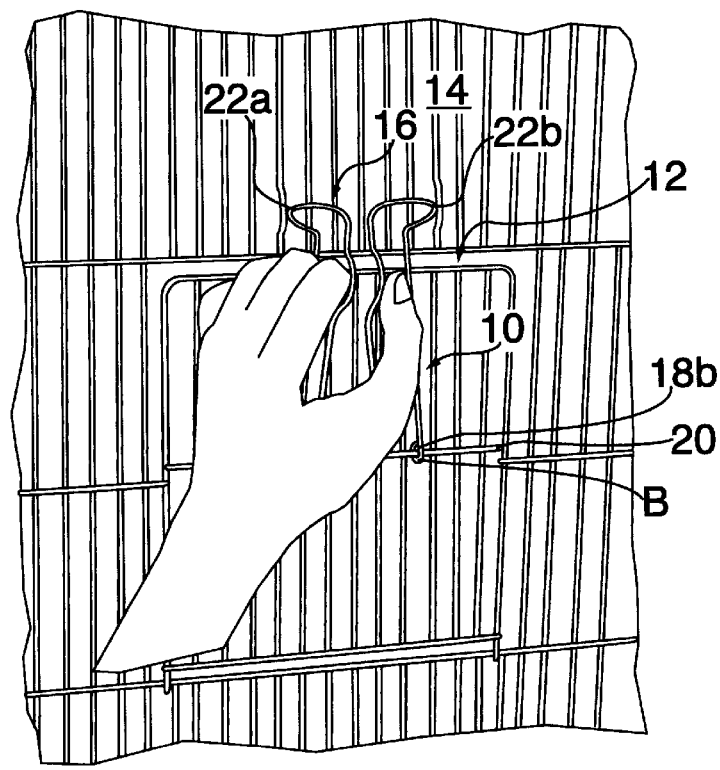
FIG. 4 is an elevational view of the cage door lock assembly of the present invention, in which a user is shown as squeezing the M-shaped portion of the locking assembly, just below the two foot-shaped locking feet thereof, just prior to opening the door of the cage.

In FIG. 4, a user is shown as squeezing M-shaped wire support 16 of the locking assembly 10, just below the two foot-shaped locking feet thereof, 22a, 22b, just prior to opening the door of the cage. Finger grips 26a, 26b may be provided to assist the user in firmly grasping M-shaped wire support 16, as best illustrated in FIGS. 5 and 7.

When gripped, and squeezed by the user, as shown in FIG. 4, the foot-shaped locking feet are inwardly displaced towards one another and simultaneously disengaged, or displaced, from the locking slots, or loops, 24a, 24b of bird cage 14.

Figure 6:
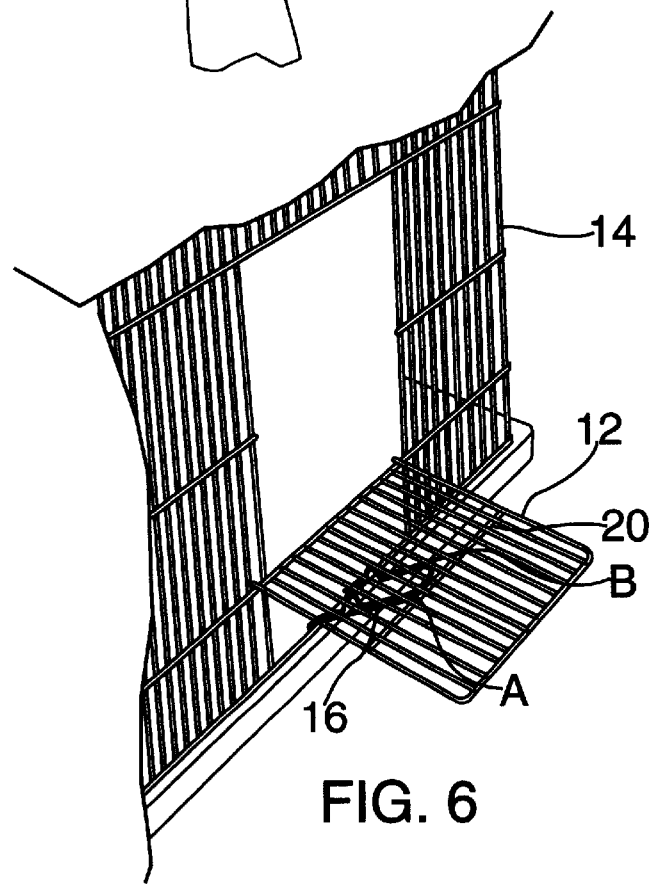
FIG. 6 is a perspective view of the cage door lock assembly of FIG. 5, in which the M-shaped portion thereof is supporting the cage door in a horizontal arrangement.
Figure 7:
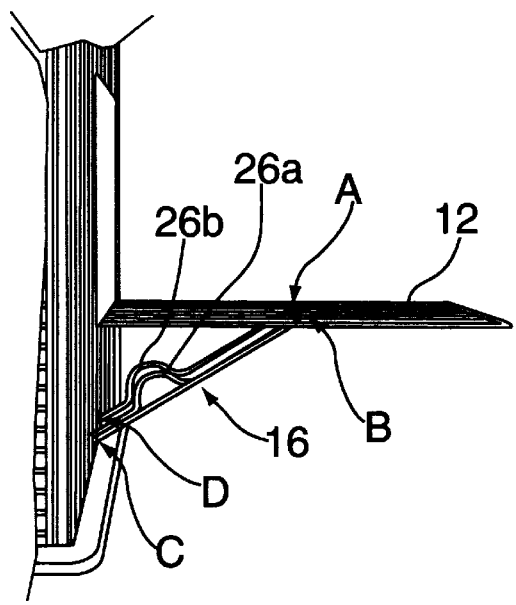
FIG. 7 is a side, elevational view of the M-shaped portion of the locking assembly of the present invention supporting the cage door in a horizontal arrangement.

Referring to FIG. 5, again, this Figure is a perspective view of the cage door lock assembly of the present invention during the process of opening the cage door 12 and pivoting M-shaped wire support 16, attached thereto, so that the foot-shaped locking feet 22a, 22b are able to set the cage door 12 in a horizontal arrangement (see, FIGS. 6 and 7.)

In FIGS. 6 and 7, the two foot-shaped locking feet 22a, 22b of M-shaped wire support 16, may either engage a lower portion of cage 14 at point C and D, respectively, or may simply be wedged, or allowed to rest, in the corner, or right angle, created by cage 14 and a base or floor so supporting it.

Figure 1:
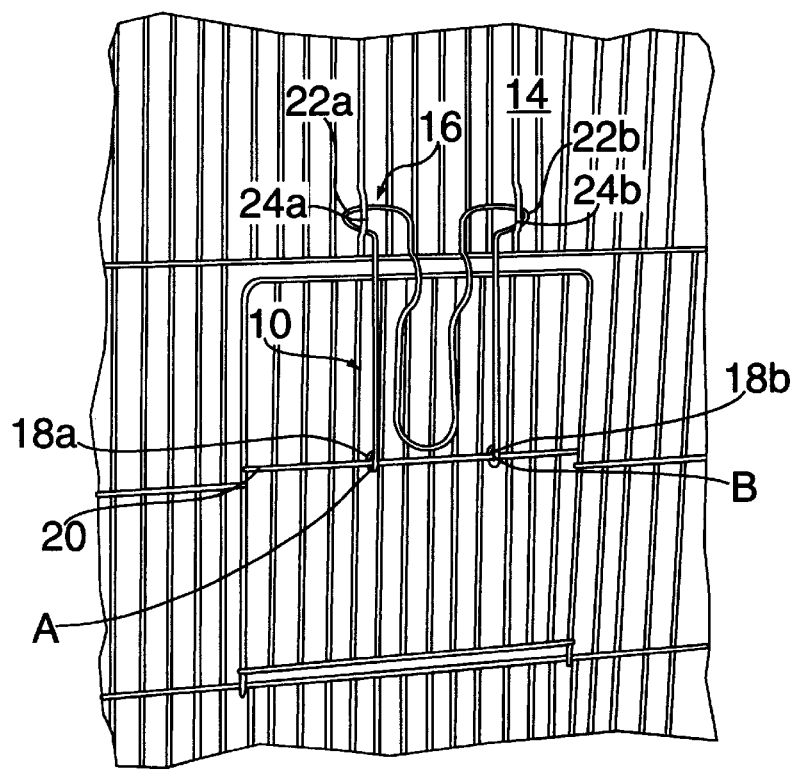
FIG. 1 is an elevational view of the cage door lock assembly of the present invention, shown as retaining the door of a bird cage in a closed position.
Figure 2:
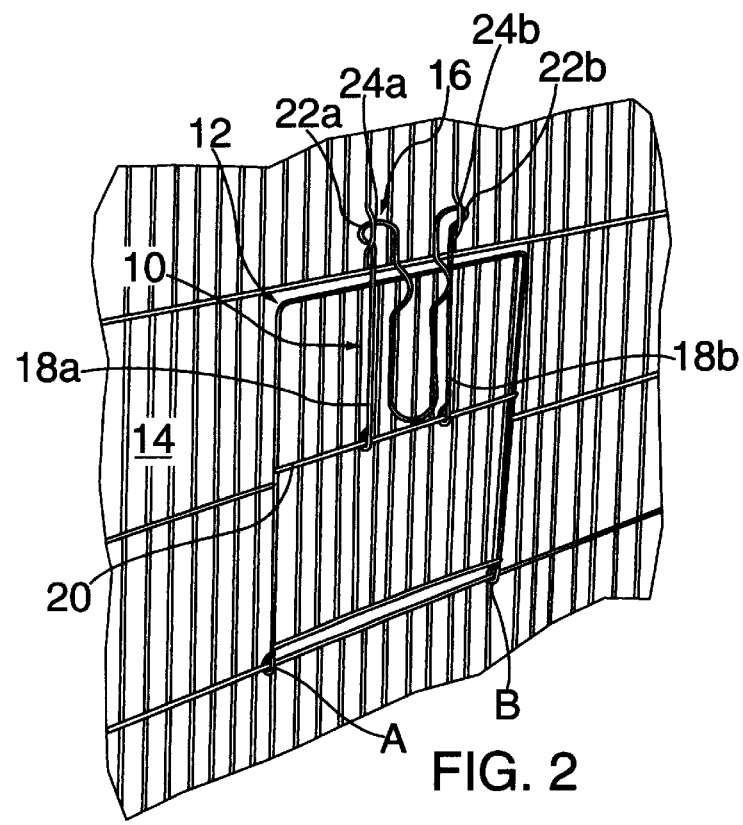
FIG. 2 is a perspective view of the cage door lock assembly of FIG. 1.
Figure 3:
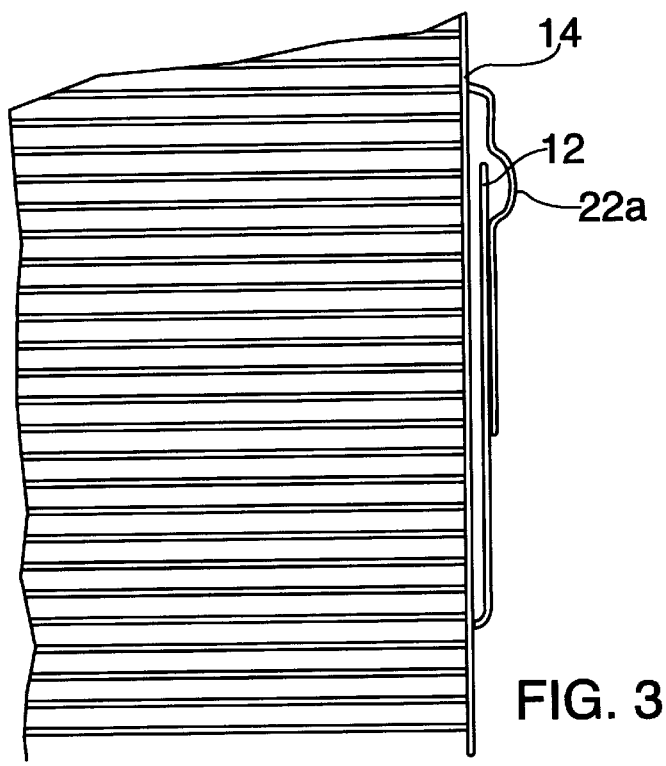
FIG. 3 is a side view of the cage door lock assembly of FIG. 1.

When it is desired to re-lock cage 14, cage door 12 is pivoted back into the "closed" position, best illustrated in FIGS. 1, 2 and 4, after which finger grips 26a, 26b are released to allow the two foot-shaped locking feet 22a, 22b to re-enter the locking slots, or loops, 24a, 24b of bird cage 14, thereby locking the cage door in place.

FIG. 8 is a schematic illustration of an alternate, preferred embodiment of the present invention in which a scissors-like element 30 is used in place of the M-shaped wire support 16 of the locking assembly 10 of FIGS. 1–7.

FIG. 9 is a schematic illustration of the scissors-like element 30 of FIG. 8, when the lower portion 32 thereof is gripped, or squeezed, by a user, thereby causing the upper, scissors-like element, or wire support, or locking feet 34a and 34b, to separate outwardly, as illustrated by the directional arrows in FIG. 9. Lower portion 32 can also be provided with finger grips 26a, 26b (not shown) to facilitate gripping thereof.

FIG. 10 is a perspective view of a bird cage 14, having the door 12 thereof in a "closed" position, showing the locking slots, or loops, of the cage, prior to attachment of the scissors-like element 30 of FIGS. 8 and 9.

Finally, FIG. 11 is a perspective view of the bird cage of FIG. 10, after the scissors-like element 30 of FIGS. 8 and 9 has been pivotally-attached, at point E and F, to a cross-bar 20 of the cage door 12, while the locking feet 34a and 34b of the scissors-like element 30 are shown in engagement with the locking slots, or loops, 24a, 24b of the cage 14.

The preferred embodiment of the invention of FIGS. 8–11 works much like the preferred embodiment of FIGS. 1–7. In this latter embodiment, scissors-like element, or wire support, 30 is squeezed in the base portion 32 thereof (see, FIGS. 9 and 11), thereby permitting locking feet 34a, 34b to be displaced outwardly from locking slots 24a, 24b to unlock cage door 12.

Various modifications may be made to the present invention. For example, the locking slots for the cage may either be integral with the cage, or may be removably attached to the cage, for example, via clip means.

While only several embodiments of the present invention have been shown and described, it will be obvious to those skilled in the art that many modifications may be made to the present invention without departing from the spirit and scope thereof.

What is claimed is:

1. A locking assembly for locking and unlocking a door of a bird or pet cage, said locking assembly in combination with said cage comprising:

a resilient wire support being pivotally-attached at two points at a first end of said resilient wire support to an outer side of a door of a cage, said resilient wire support having, at a second end distal from said first end, two substantially foot-shaped members said resilient wire support being substantially M-shaped with a generally U-shaped middle leg defining a pair of spaced-apart arms for squeezing said resilient wire support for causing said inward displacement of said two substantially foot-shaped members; and, two locking slots being provided for the cage adjacent the door of the cage, each of said two locking slots being capable of receiving a respective member of said two substantially foot-shaped members of said resilient wire support, so that when said resilient wire support is gripped and squeezed together via said U-shaped middle leg thereof, thereby causing an inward displacement of said two substantially foot-shaped members, said two substantially foot-shaped members are each able to be placed within a respective one of said two locking slots for said cage and then released, or removed from a respective one of said two locking slots provided for said cage, to either lock, or unlock, respectively, the door of said cage.

2. The locking assembly according to claim 1, wherein said resilient wire support includes a pair of raised finger grips, each of which is provided on one of said spaced apart arms of said U-shaped middle leg.

3. The locking assembly according to claim 1, wherein said resilient wire support is made of a resilient plastic.

4. The locking assembly according to claim 1, wherein said resilient wire support is made of a resilient metal.

5. The locking assembly according to claim 1, wherein said two locking slots for said cage are integral parts of said cage.

6. The locking assembly according to claim 1, wherein said two locking slots for said cage are removably attached to said cage.

7. The locking assembly according to claim 1, further comprising means for supporting said cage door in an open position.

8. A locking assembly for locking and unlocking a door of a bird or pet cage, said locking assembly in combination with said cage comprising:

a resilient wire support being pivotally-attached at two points at a first end of said resilient wire support to an outer side of a door of a cage, said resilient wire support having, at a second end distal from said first end, two substantially foot-shaped members, said resilient wire support being in a scissor-like arrangement and comprising a generally U-shaped base having a pair of arms with upper end portions which overlap in a scissor-like manner, said upper end portions having free ends to each of which one of said foot-shaped members is attached; and two locking slots being provided for the cage adjacent the door of the cage, each of said two locking slots being capable of receiving a respective member of said two substantially foot-shaped members of said resilient wire support, so that when said resilient wire support is gripped and squeezed together thereby causing an outward displacement of said two substantially foot-shaped members, said two substantially foot-shaped members are able to be placed within respective said two locking slots for said cage and then released, or removed from respective said two locking slots provided for said cage, to either lock, or unlock, respectively, the door of said cage.

9. The locking assembly according to claim 8, wherein said resilient wire support include finger grips for squeezing said resilient wire support for causing said outward displacement of said two substantially foot-shaped members.

10. The locking assembly according to claim 8, wherein said resilient wire support is made of a resilient plastic.

11. The locking assembly according to claim 8, wherein said resilient wire support is made of a resilient metal.

12. The locking assembly according to claim 8, wherein said two locking slots for said cage are integral parts of said cage.

13. The locking assembly according to claim 8, wherein said two locking slots for said cage are removably attached to said cage.

14. The locking assembly according to claim 8, further comprising means for supporting said cage door in an open position.

\* \* \* \* \*